United States Patent [19]

Echte et al.

[11] Patent Number: 4,567,232

[45] Date of Patent: Jan. 28, 1986

[54] CONTINUOUS PREPARATION OF RUBBER-MODIFIED POLYMERS OF VINYL-AROMATICS

[75] Inventors: Adolf Echte, Ludwigshafen; Hermann Gausepohl, Mutterstadt; Juergen Hambrecht, Neckargemuend-Dilsberg; Karl Gerberding, Wachenheim, all of Fed. Rep. of Germany

[73] Assignee: BASF Aktiengesellschaft, Fed. Rep. of Germany

[21] Appl. No.: 650,568

[22] Filed: Sep. 13, 1984

Related U.S. Application Data

[63] Continuation-in-part of Ser. No. 445,859, Dec. 1, 1982, abandoned, which is a continuation-in-part of Ser. No. 324,985, Nov. 25, 1981, abandoned.

[30] Foreign Application Priority Data

Dec. 16, 1980 [DE] Fed. Rep. of Germany ....... 3047303

[51] Int. Cl.$^4$ .............................................. C08F 279/02
[52] U.S. Cl. ........................................ 525/53; 525/316
[58] Field of Search .................................. 525/53, 316

[56] References Cited

U.S. PATENT DOCUMENTS

| | | | |
|---|---|---|---|
| 3,903,202 | 9/1975 | Carter | 525/316 |
| 4,011,284 | 3/1977 | Gawne | 525/53 |
| 4,315,083 | 2/1982 | Burk | 525/53 |

*Primary Examiner*—Paul R. Michl
*Attorney, Agent, or Firm*—Keil & Weinkauf

[57] ABSTRACT

A process for the continuous preparation of rubber-modified polymers of vinyl-aromatics, wherein a mixture which contains a monomeric aromatic vinyl compound and from 3 to 30% by weight, based on the monomer, of an elastomeric polymer, with or without a solvent, is polymerized, in the presence of a free radical initiator and in the presence or absence of a mercaptan as chain transfer agent, at from 80° to 180° C., with stirring, in a cascade of two or more isothermally operated reaction zones and of one or more additional reaction zones which can be operated isothermally or with a rising temperature profile in such a way that the residence time of the reactants in the first reaction zone is $\leq 35$ minutes. The polymer obtained is freed from vinyl-aromatic monomer, and from any solvent, in a devolatilization zone. The product is useful for the production of injection moldings.

2 Claims, No Drawings

CONTINUOUS PREPARATION OF RUBBER-MODIFIED POLYMERS OF VINYL-AROMATICS

This application is a continuation-in-part of application Ser. No. 445,859, filed on Dec. 1, 1982, now abandoned which was a continuation-in-part of application, Ser. No. 324,985 filed on Nov. 25, 1981, now abandoned.

The present invention relates to a process for the continuous preparation of rubber-modified polymers of vinyl-aromatics, in mass or in solution, the polymerization being carried out in the conventional temperature range, in a cascade of two or more isothermally operated reaction zones and of one or more additional reaction zones which can be operated isothermally or with a rising temperature profile, and the resulting polymer being worked up in a conventional manner.

The relevant prior art includes (1) U.S. Pat. No. 3,243,481, (2) U.S. Pat. No. 3,868,434, (3) U.S. Pat. No. 3,658,946, (4) German Laid-Open Application DOS No. 2,659,175 and (5) Canadian Pat. No. 1,114,984.

It is known that the properties of styrene polymers which have been made impact-resistant depend substantially on the degree of grafting. Accordingly, endeavours to improve the grafting onto the rubber employed as the soft component have been made before.

Since it has not hitherto been possible to achieve this grafting to the desired degree, attempts have been made, inter alia, to arrive at special properties of the thermoplastics, such as high impact strength, high gloss or good translucency, by employing anionically produced block rubbers of the A-B, A-B-A or B-A-B type (A being styrene and B being butadiene) or by using star-shaped block copolymers, as such or as a mixture with the corresponding homopolymers. Examples of this approach include German Laid-Open Applications DOS 2,646,508, DOS 2,646,509, DOS 2,717,777 and DOS 2,504,118. The above approach is however expensive, since block rubbers, in which one block has thermoplastic properties, require special processing techniques.

It is therefore more advantageous if the linkage of the rubber component to the thermoplastic component takes place in situ, ie. during formation of the thermoplastic as described in (1) and (2). The initiators employed are the conventional peroxides.

The disadvantages of the processes described is that because of technical difficulties associated with the polymerization, such as inadequate heat removal or excessive solution viscosity of premature crosslinking of the rubber at high temperatures, only low concentrations of initiator can be used [cf. (4)] of alternatively, if conventional initiator concentrations are used, only relatively low temperatures can be employed [cf. (1) and (2)]. This has the effect that the degree of grafting is too low to permit the preparation of products having specific properties, for example translucency, or having very good mechanical properties.

(5) describes how the grafting onto the rubber may be increased by carrying out the polymerization adiabatically in the initial stage (compare Example 1). It is true that this method gives good grafting, but scaling up to industrial operation presents insuperable difficulties, because the reaction becomes uncontrollable. Hence, it has been proposed (5) to achieve the high degree of grafting under isothermal conditions in a tubular reactor, by free radical initiation at a high temperature. However, subsequent experiments have shown that the period for which such a tubular reactor can be run is very short; the reactor becomes blocked with crosslinked material within 1-2 days.

It is an object of the present invention to provide a process which, whilst giving adequate grafting onto the rubber, avoids the difficulties mentioned, such as insufficient heat removal, premature crosslinking of the rubber or deposition of material on the walls of the reactor, and which can be scaled up to industrial operation.

We have found that this object is achieved by the measures recited in claim 1.

The continuous preparation of rubber-modified polymers of vinyl-aromatics has been adequately described, especially in (3) (cf. the kettle-tower-cascade process principle) so that, as regards the general method of carrying out the continuous process, reference may be made to publication (3) and to the prior art discussed therein.

Publication (3) discloses a process for the thermal polymerization of styrene in the presence of dissolved rubber, wherein the first reactor must be operated so that the amount of solids is not more than twice the amount of rubber present or 16 percent of the total. This signifies low styrene conversions.

In accordance with the present invention, the solids formation limitation allied to thermal polymerization is relaxed by the use of free radical initiators, the phase inversion boundary surprisingly being shifted to higher relative polystyrene contents. The extent to which it exceeds the value known from thermal polymerization depends on the type and amount of the initiators and the conditions of the reaction, but can always be ascertained by means of a phase contrast microscope. The free radical initiated polymerization is only subject to the condition that phase inversion must not be reached in the first reactor. The upper limit of the amount of solids formed in the first reactor also does not apply any longer.

The advantage of the novel process, in which the reaction in the first stirred kettle is not taken to the phase inversion stage, and the reaction in the second stirred kettle is taken beyond the phase inversion stage, resides presumably in the separation of the grafting operation and the adjustment of the particle size. In the early phases of the polymerization a larger proportion of the polybutadiene is grafted than in the later ones, and the graft copolymer acts as an emulsifier between the polystyrene phase and the polybutadiene phase. This emulsifier makes it easier to adjust the particle size in the second stirred kettle of the prepolymerization section, in which kettle the reaction must be taken beyond the phase inversion stage.

Suitable monomeric aromatic vinyl compounds (a1) for the process according to the invention are styrene, its nuclear-substituted derivatives and χ-methylstyrene. The said compounds can be used either individually or as mixtures with one another. Preferably, styrene alone is used.

Suitable elastomeric polymers (a2) which can be used in the process according to the invention are natural or synthetic rubbers as well as styrene-butadiene block copolymers with up to 25% by weight of styrene units, though such block copolymers make the process more expensive. Particularly suitable rubbers are polybutadienes of the medium-cis or high-cis type with weight-average molecular weights of from 70,000 to 350,000, as well as polyisoprenes, polyisobutylenes and copolymers of butadiene and isoprene. Ethylene-propylene copolymers and so-called EPDM rubbers are also suitable. Other rubbers, particularly suitable for the preparation of weathering-resistant molding materials are rubbers based on acrylates, or predominantly on acrylates with minor proportions of polymerized units of conjugated diolefins, such as polybutadiene or polyisoprene. The rubbers are used in amounts of from 3 to 30%, preferably from 4 to 15%, by weight, based on the monomer or monomers a1.

The process according to the invention can be carried out as a mass polymerization or solution polymerization. In the former case, the rubber is dissolved in the vinyl-aromatic monomer or monomers to be polymerized and the polymerization is started by addition of initiators and, if desired, chain transfer agents.

If the polymerization is carried out in solution, suitable solvents (a3) are toluene, xylene, ethylbenzene, methyl ethyl ketone or tetrahydrofuran. The said solvents are used in amounts of from 2 to 25% by weight, based on vinyl-aromatic monomer. Ethylbenzene is particularly preferred for the process according to the invention.

Suitable radical initiators (b) are, in particular, alkyl peroxides or acyl peroxides. The use of dibenzoyl peroxide, tertiary butyl peroctoate or tertiary butyl perbenzoate, in amounts of from 0.05 to 0.5% by weight, based on monomer or monomers, is preferred.

Suitable chain transfer agents (c) are the conventionally used mercaptans of 4 to 18 carbon atoms. Amongst the mercaptans, n-butylmercaptan, n-octylmercaptan and n- and t-dodecylmercaptan have proved particularly suitable. The amount of mercaptan, where any is employed, is as a rule from 0.01 to 0.3% by weight, based on the vinyl-aromatic monomer.

The polymerization temperatures are from 80° to 180° C., taking all the reaction zones into account. In the drying stage or devolatilization stage, even higher temperatures are used. The process according to the invention is carried out in a cascade of 2 or more reaction zones which are operated isothermally, and of one or more additional reaction zones which can be operated isothermally or with a rising temperature profile. Thus it is possible to carry out the process in reaction zones of different construction, for example stirred kettle reactors and tubular reactors. Preferably, however, the process according to the invention is carried out in a cascade of reaction zones, for example in a 2-kettle/2-tower cascade. In every case it is necessary that the process should be carried out isothermally in the kettles and isothermally or with a rising temperature profile in the tower reactors. Preferably, the first reaction zone is in the form of a stirred kettle. Concerning the method of carrying out the process according to the invention in only 2 reaction zones, in the form of horizontal reactors, reference may be made to U.S. Pat. No. 3,903,202.

During the polymerization, in particular after preparation of the rubber solution, conventional additives, such as antioxidants, ultraviolet stabilizers, lubricants, fillers and the like may be added to the reaction charge, in conventional amounts known to a skilled worker. The said substances may also be added prior to processing the impact-resistant polymers obtained by the process according to the invention.

In principle it is possible, as already described, to feed the polymer solution, after it has passed through the second reaction zone, to a conventional devolatilization zone where it is freed from residual monomer and solvent. However, it is more advantageous to increase the conversion in one or more additional reaction zones, preferably isothermally operated tube reactors. It is preferred to use two tube reactors in which conversion, based on styrene, can be taken to from 60 to 90% by weight. The conversion can be taken from approximately 19% by weight to the said final level (60 to 90% by weight). In reaction zones 1 and 2 the conversion is taken from 0.5 to not more than 50%, preferably from 2 to 35%, especially from 6 to 30% by weight, based on styrene, before the polymer solution is freed in a conventional manner from vinyl-aromatic monomer and from solvent, if any, in a devolatilization zone.

It is essential, for carrying out the process according to the invention, that when carrying out the polymerization isothermally the residence time of the polymer solution in the first stirred kettle should be not more than 35 minutes, preferably from 5 to 25 minutes. This condition can be achieved, by a skilled worker, by selecting the throughput rate in accordance with the given reactor sizes.

The advantage of the process according to the invention is that high degrees of grafting onto the rubber and high grafting yields are achieved without difficulties in respect of heat removal, deposits on the kettle walls, or premature crosslinking. A further advantage is that products having high impact strength or having good translucency can deliberately be prepared with one and the same rubber by suitable choice of the reaction conditions.

The molding materials obtained by the process according to the invention can be converted by conventional thermoplastic processing methods, for example by extrusion, injection molding, calendering, blow-molding, compression-molding or sintering; the production of injection moldings from the materials prepared by the novel process is particularly preferred.

The products can also be used for blending with other impact-resistant polymers which have different rubber-phase particle sizes or different morphologies.

The product properties referred to in the Examples and comparative experiments were measured as follows:
1. Yield stress according to DIN 53,445
2. Tensile strength according to DIN 53,445
3. Notched impact strength, $a_{KL}$ kJ/m$^2$, according to draft DIN, in preparation in accordance with the decision of the Plastics Standards Committee 4.3 of March 1975.

The Examples and comparative experiments which follow illustrate the invention. All parts and percentages are by weight, unless stated otherwise. In all Examples the first reaction zone (first stirred kettle) was operated so that a continuous rubber phase was present, i.e. phase inversion was incomplete under the reaction conditions used. In the second reaction zone (second stirred kettle), which was also operated isothermally, there was a continuous phase of polystyrene dissolved in styrene, the rubber, dissolved in monomer, being dispersed in this phase. The particle size of the rubber phase was adjusted in the second reaction zone, as it was here that phase inversion was completed.

The reaction was then completed by polymerizing the remaining monomer to a solids content of 88%, removing the remaining monomer at elevated temperature in vacuo, extruding the polymer melt in strands and chopping the strands into granules. The test results were obtained on compression-molded specimens according to DIN 53,455 (tensile test) and DIN 53,453 (impact test, Charpy test).

EXAMPLE 1

6 parts of a polybutadiene of the medium-cis type (Diene HX 529) were dissolved in a mixture of 6 parts of ethylbenzene and 88 parts of styrene. 0.1 part of tert.-dodecylmercaptan and 0.18 part of tert.-butylperbenzoate were then added to the mixture and the latter was polymerized isothermally in a cascade of four reactors. The first two reactors consisted of stirred kettles having an effective capacity of 1 and 5 liters respectively. The other two reactors were polymerization towers each with a capacity of 10 liters. The throughput was 5 l/h and the temperatures were 115° C. in the first reactor and 120° C. in the second reactor, with respective conversions of 7.0% and 19%. The temperatures in the tower reactors were 135° C. and 146° C., with styrene conversions of 50% and 78.4% respectively. The residence time in the first reaction zone (first stirred kettle) was 12 minutes. The product obtained was translucent and essentially had a capsule-particle morphology.

The following properties were measured:
Yield stress: 27 N/mm$^2$
Tensile strength: 24 N/mm$^2$
Notched impact strength: 10.5 kJ/m$^2$

EXAMPLE 2

8 parts of a commercial EPDM rubber were mixed with 92 parts of styrene, 4 parts of paraffin oil, 0.1 part of tert.-dodecylmercaptan and 0.2 part of tert.-butylperbenzoate, and the mixture was polymerized, as described in Example 1, in a reaction cascade of four reactors.

| Reactor 1: | Capacity | 1 liter |
|---|---|---|
|  | Conversion | 12.7% |
|  | Temperature | 110° C. |
| Reactor 2: | Capacity | 1 liter |
|  | Conversion | 25.7% |
|  | Temperature | 123° C. |

The throughput was 4 liters/h. The volumes of reactors 3 and 4 were 10 liters each. The polymerization temperatures were 135° C. and 143° C. The solids content in the last reactor was 88%. The residence time in the first reaction zone was 15 minutes. The following were measured on samples of the product obtained:
Yield stress: 28 N/mm$^2$
Tensile strength: 21.5 N/mm$^2$
Notched impact strength: 13.4 kJ/m$^2$

EXAMPLE 3

Example 2 was repeated, but polymerizing to only 7% conversion in the first reactor. To achieve this, the throughput was increased from 4 liters/h to 9 liters/h. The residence time in the first reaction zone was 7 minutes.

| Reactor 1: | Capacity | 1 liter |
|---|---|---|
|  | Conversion | 7% |
|  | Temperature | 110° C. |
| Reactor 2: | Capacity | 2 liters |
|  | Temperature | 130° C. |
|  | Total conversion | 23.8% |

The temperatures in reactors 3 and 4 were 136° C. and 144° C. respectively. Polymerization was taken to a solids content of 88%. The product obtained had the following properties:
Yield stress: 27 N/mm$^2$
Tensile strength: 21.5 N/mm$^2$
Notched impact strength: 12.1 kJ/m$^2$

COMPARATIVE EXPERIMENT

Example 2 was repeated, but with the throughput lowered to 1.2 liters/h. Under these conditions, the residence time in the first reaction zone was 50 minutes.

The product obtained in this way had very poor impact strength, as may be seen from the following measurements:
Yield stress: 30.2 N/mm$^2$
Tensile strength: 18.6 N/mm$^2$
Notched impact strength: 6.2 kJ/m$^2$.

We claim:
1. A process for the continuous preparation of rubber-modified polymers of vinyl-aromatics, by polymerizing a mixture which contains
   (a1) one or more monomeric aromatic vinyl compounds
   (a2) one or more elastomeric polymers, in an amount of from 3 to 30% by weight, based on monomer (a1), with or without
   (a3) a solvent in the presence of
   (b) free radical initiators, with or without
   (c) chain transfer agents, and with or without
   (d) lubricants,
at from 80° to 180° C., with stirring, in a cascade comprising a first and second or more isothermally operated reaction zones consisting of stirred reactors, and one or more additional reaction zones, preferably tube reactors, and then freeing the polymer obtained, in a devolatilization zone, from vinyl-aromatic monomers and from solvents, if any, and recycling the solvents and any residual monomers to the process, wherein monomer conversion is adjusted so that the elastomer phase is the continuous phase in the first stirred reactor and the disperse phase in the second stirred reactor, and that the residence time of the reactants in the first stirred reactor is from 1 to 35 minutes.

2. A process as claimed in claim 1 wherein the residence time in the first stirred reactor is from 5 to 25 minutes.

\* \* \* \* \*